United States Patent
Schwartz

[19]

[11] Patent Number: 6,035,930
[45] Date of Patent: Mar. 14, 2000

[54] POWER STEERING RESERVOIR AND COOLER

[75] Inventor: Scott W. Schwartz, Waterloo, Wis.

[73] Assignee: Nelson Industries, Inc., Stoughton, Wis.

[21] Appl. No.: 09/108,056

[22] Filed: Jun. 30, 1998

[51] Int. Cl.[7] .................................................. F28F 3/12
[52] U.S. Cl. ................. 165/169; 165/47; 165/DIG. 916; 210/184; 210/186
[58] Field of Search ........................... 165/47, 169, 916; 60/467, 912; 210/186, 184

[56] References Cited

U.S. PATENT DOCUMENTS

| | | | |
|---|---|---|---|
| 1,841,762 | 1/1932 | Samesreuther et al. ............... | 165/169 |
| 2,178,930 | 11/1939 | Crawford ............................. | 210/186 |
| 2,331,482 | 10/1943 | Lamb .................................. | 210/186 |
| 2,348,247 | 5/1944 | Dushane, Jr. ........................ | 210/186 |
| 3,167,916 | 2/1965 | Schroeder . | |
| 3,223,197 | 12/1965 | Conover et al. . | |
| 3,318,376 | 5/1967 | Vihl .................................... | 165/169 |
| 3,411,293 | 11/1968 | Akins . | |
| 3,482,699 | 12/1969 | Kauffman et al. ................... | 210/184 |
| 3,498,373 | 3/1970 | Lughausen ........................... | 165/169 |
| 3,751,191 | 8/1973 | Mott, Jr. et al. . | |
| 3,800,536 | 4/1974 | Miller et al. . | |
| 3,831,671 | 8/1974 | Was . | |
| 3,887,467 | 6/1975 | Johnson .............................. | 210/186 |
| 4,022,272 | 5/1977 | Miller . | |
| 4,205,720 | 6/1980 | Epstein ................................. | 165/169 |
| 4,298,060 | 11/1981 | Williams .............................. | 165/169 |
| 4,368,775 | 1/1983 | Ward . | |
| 4,585,398 | 4/1986 | Drake . | |
| 4,669,533 | 6/1987 | Hehl . | |
| 4,813,477 | 3/1989 | Hansen et al. ....................... | 165/47 |
| 4,966,232 | 10/1990 | Asechberger et al. ............... | 165/169 |
| 5,002,117 | 3/1991 | Buckley et al. . | |
| 5,095,971 | 3/1992 | Hehl .................................... | 165/47 |
| 5,101,855 | 4/1992 | Tammera . | |
| 5,101,885 | 4/1992 | Drake .................................. | 165/47 |
| 5,277,265 | 1/1994 | Zaun . | |
| 5,326,461 | 7/1994 | Legrand et al. ..................... | 210/186 |
| 5,579,728 | 12/1996 | Gotmalm . | |

*Primary Examiner*—Ira S. Lazarus
*Assistant Examiner*—Terrell McKinnon
*Attorney, Agent, or Firm*—Andrus, Sceales, Starke & Sawall

[57] ABSTRACT

A combined power steering hydraulic fluid reservoir and cooling unit (12, 112) includes a housing (14, 114) having a reservoir tank (16, 116) for receiving and collecting hydraulic fluid from a power steering gear (18) and holding the hydraulic fluid in readiness for supply to a hydraulic pump (20). The housing has a heat exchanger (22, 122) with a cooling liquid flow path therethrough in heat transfer relation with the hydraulic fluid, eliminating a hydraulic fluid cooler otherwise connected in series between the power steering gear and the reservoir tank, and eliminating two extra hose connections therefor.

14 Claims, 5 Drawing Sheets

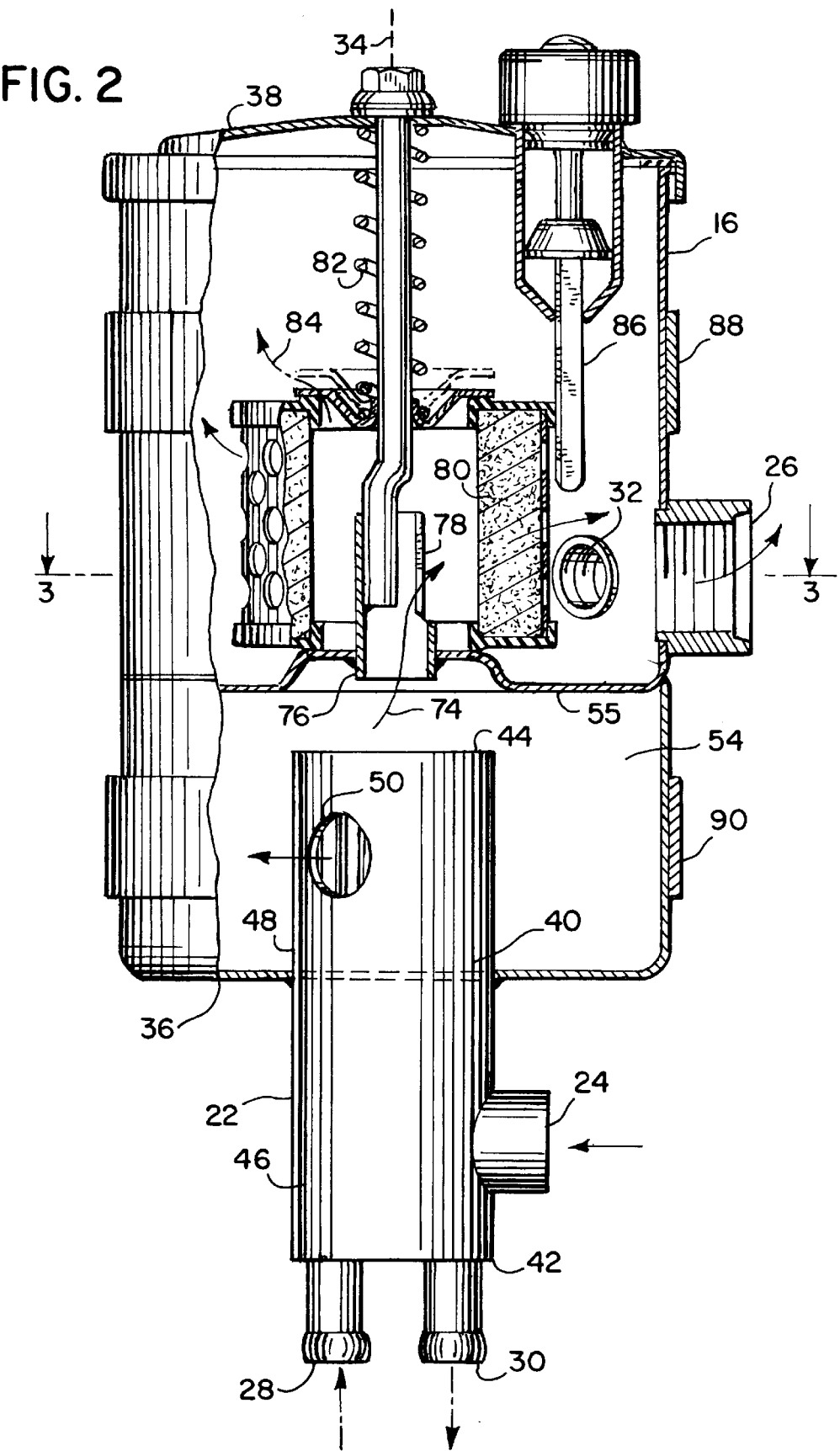

6,035,930

POWER STEERING RESERVOIR AND COOLER

BACKGROUND AND SUMMARY OF THE INVENTION

The invention relates to power steering reservoirs, particularly on heavy duty trucks and busses, and the need to dissipate heat within the system, in reduced space and with lower cost.

One function of power steering reservoirs on heavy duty trucks and busses is to dissipate heat generated within the system. A larger reservoir is used when additional cooling is required. In some cases, a hydraulic fluid cooler is also required to reduce the operating temperature to an acceptable level. The hydraulic fluid cooling device is typically connected to the return hose between the power steering gear and the reservoir, i.e. a series connection with two additional hose connections.

Truck manufacturers have expressed a need for reducing system temperatures. High operating temperatures cause seals, hoses, and hydraulic fluid to break down and wear out more quickly. A standard off the shelf hydraulic oil cooler will significantly reduce system temperatures. However, the added cost and installation time is objectionable.

Truck aerodynamic improvements are limiting the amount of air flow through the engine compartment. This reduction in air flow also reduces the cooling efficiency of the power steering reservoir. Sloping front hoods are reducing under hood space, which makes larger reservoirs impractical.

The present invention addresses and solves the above-noted need in a particularly simple and cost effective manner. The invention enables elimination of a hydraulic cooler otherwise connected in series between the power steering gear and the reservoir, and eliminates the two extra hose connections therefor.

BRIEF DESCRIPTION OF THE DRAWINGS

FIG. 2 is a side view partially in section of a combined power steering hydraulic fluid reservoir and cooling unit constructed in accordance with the invention.

DETAILED DESCRIPTION OF THE INVENTION

Figure 1:
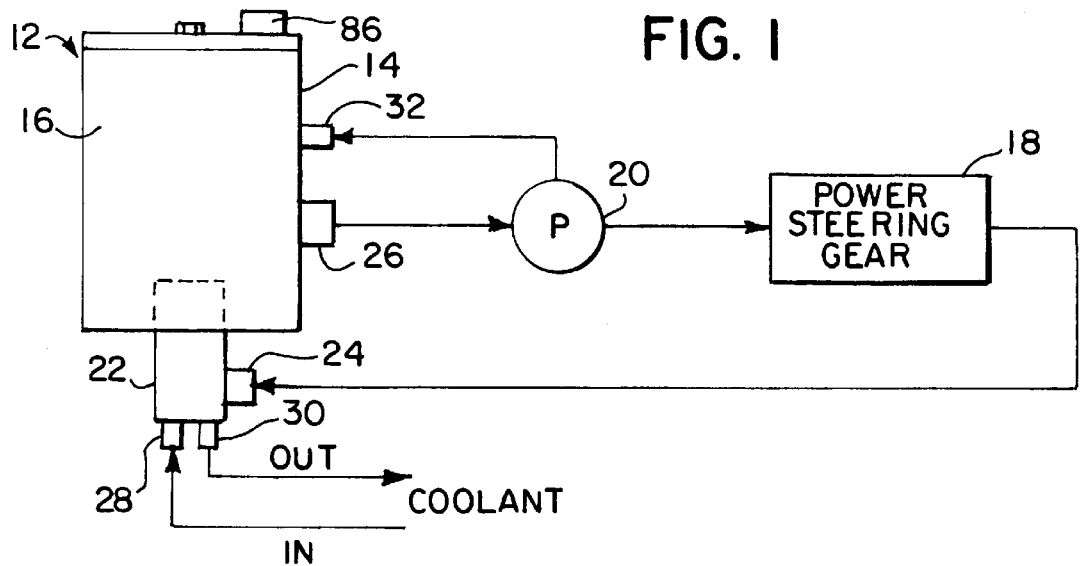
FIG. 1 is a schematic illustration of a power steering system incorporating the present invention.

FIG. 1 shows a combined power steering hydraulic fluid reservoir and cooling unit 12 including a housing 14 having a reservoir tank 16 for receiving and collecting hydraulic fluid from a power steering gear 18 and holding the hydraulic fluid in readiness for supply to a hydraulic pump 20. The housing has a heat exchanger 22 with a cooling liquid flow path therethrough in heat transfer relation with the hydraulic fluid, eliminating a hydraulic fluid cooler otherwise connected in series between power steering gear 18 and tank 16, and eliminating the two extra hose connections therefor. Housing 14 has a first hose connection 24 providing a hydraulic fluid inlet, a second hose connection 26 providing a hydraulic fluid outlet, a third hose connection 28 providing a cooling liquid inlet, and a fourth hose connection 30 providing a cooling liquid outlet. The housing may include a further hydraulic fluid inlet 32 as a bypass receiving excess flow from pump 20.

FIG. 2 shows reservoir tank 14, which is Nelson Industries Part No. 94131A, modified in accordance with the present invention. The tank is a cylindrical canister extending axially along a vertical axis 34 between distally opposite lower and upper axial ends 36 and 38. Extending through lower axial end 36 is heat exchanger 22, provided by a Serck Part No. 31002-97-AA01. Heat exchanger 22 extends axially along axis 34 through axial end 36 of reservoir tank 16. The cooling liquid flow path through heat exchanger 22 is in heat transfer relation with hydraulic fluid in tank 16.

Heat exchanger 22 has a side wall 40 extending axially between distally opposite lower and upper end walls 42 and 44. Cooling liquid inlet 28 and cooling liquid outlet 30 both extend axially through lower end wall 42. Hydraulic fluid inlet 24 extends radially through side wall 40. Side wall 40 of heat exchanger 22 extends axially through lower axial end 36 of reservoir tank 16. Side wall 40 of heat exchanger 22 has a first portion 46 exterior to reservoir tank 16, and a second portion 48 interior to reservoir tank 16. Hydraulic fluid inlet 24 extends radially through first portion 46 of side wall 40. Second portion 48 of side wall 40 has a pair of openings 50, 52, FIGS. 2, 4 and 5, therethrough passing hydraulic fluid into lower portion 54 of tank 16 below divider wall 55.

Figure 3:
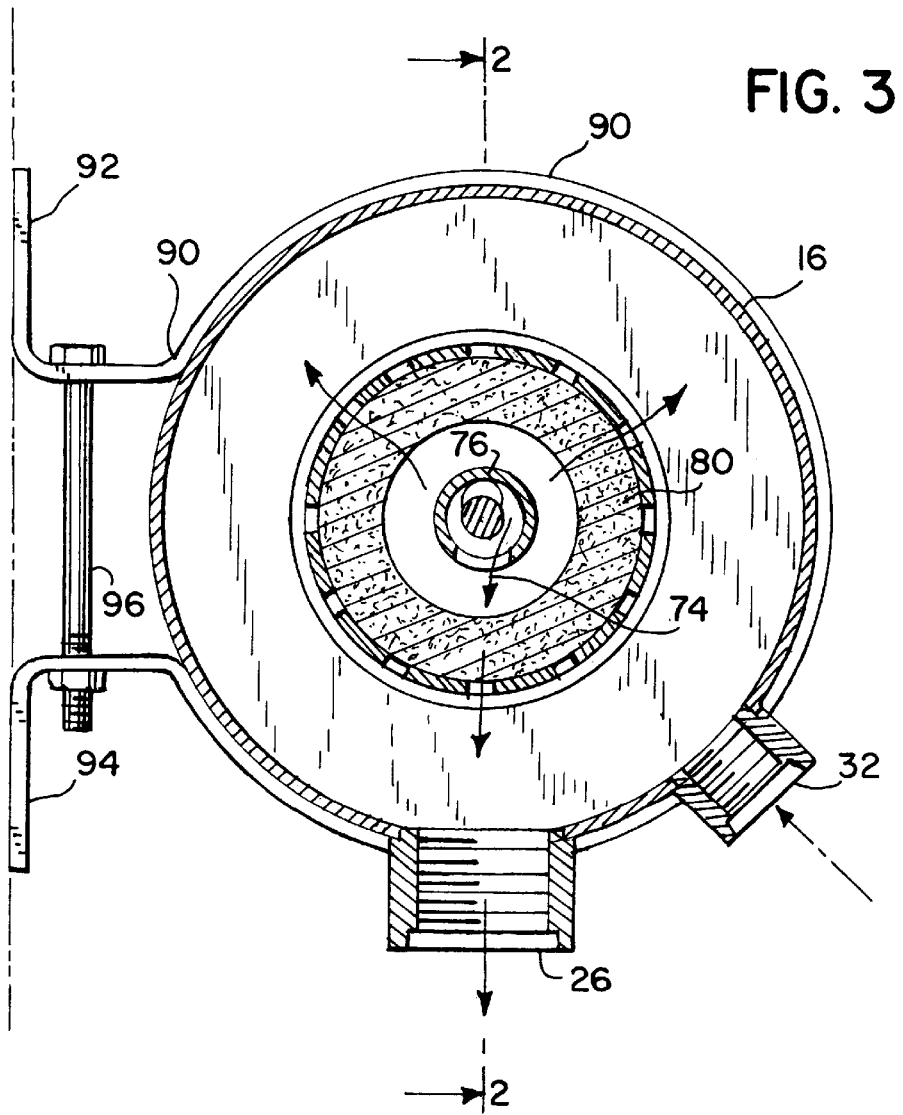
FIG. 3 is a sectional view taken along line 3—3 of FIG. 2.
Figure 4:
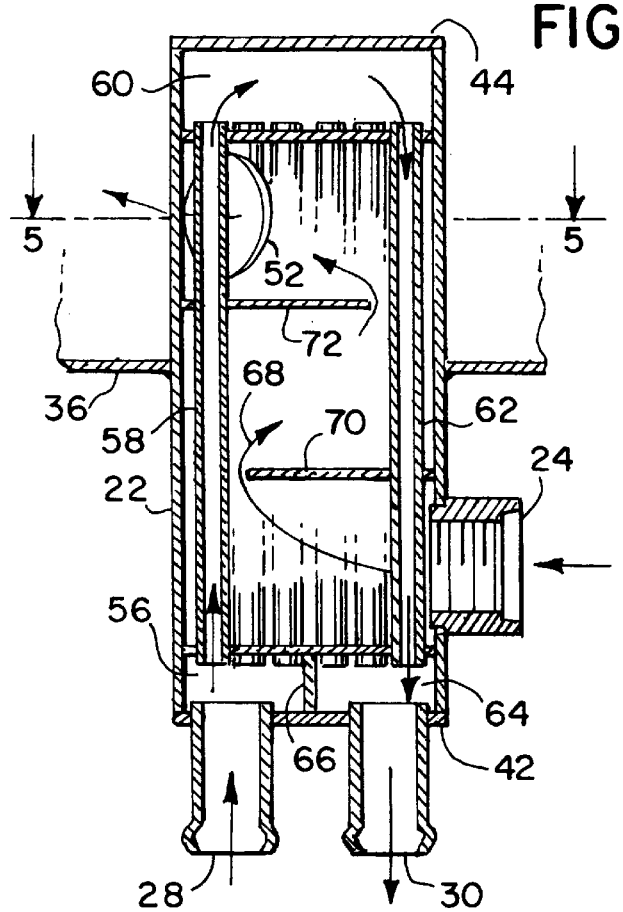
FIG. 4 is a sectional view of a portion of the structure of FIG. 2.
Figure 5:
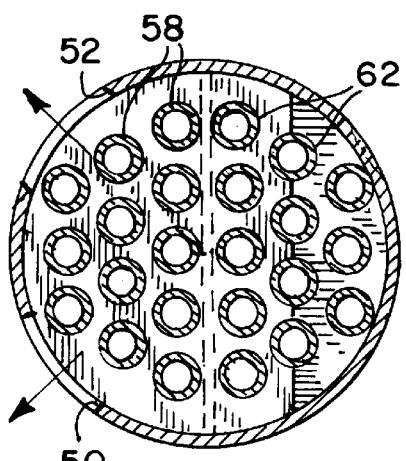
FIG. 5 is a sectional view taken along line 5—5 of FIG. 4.

Coolant liquid flows from heat exchanger inlet 28 into lower entry plenum 56, FIG. 4, then upwardly through a plurality of transfer tubes 58 to upper plenum 60 then downwardly through a plurality of transfer tubes 62 to lower exit plenum 64 then to cooling liquid outlet 30. Entrance and exit plenums 56 and 64 are separated by dividing wall 66. Hydraulic fluid flows from hydraulic fluid inlet 24 into heat exchanger 22 and is directed around tubes 62, 58 in a tortuous flow path 68 by directional divider walls 70, 72, and then flows through openings 50, 52 into lower portion 54 of tank 16. The hydraulic fluid then flows upwardly as shown at arrow 74, FIG. 2, through central standpipe 76 and then radially outwardly through openings such as 78 therein, and then through filter 80 to hydraulic fluid outlet 26. If filter 80 becomes clogged, or the pressure drop thereacross otherwise exceeds a given threshold, the pressure build-up compresses bypass spring 82 axially upwardly to permit hydraulic fluid to bypass the filter as shown at flow arrow 84, as is known. Dipstick 86 in the housing permits checking of fluid level. A pair of mounting bands or straps 88, 90 extend around the housing and have ends such as 92, 94, FIG. 3, mountable to a vertical surface in the engine compartment, such as a fire wall, etc., and tightenable by a bolt 96.

Figure 6:
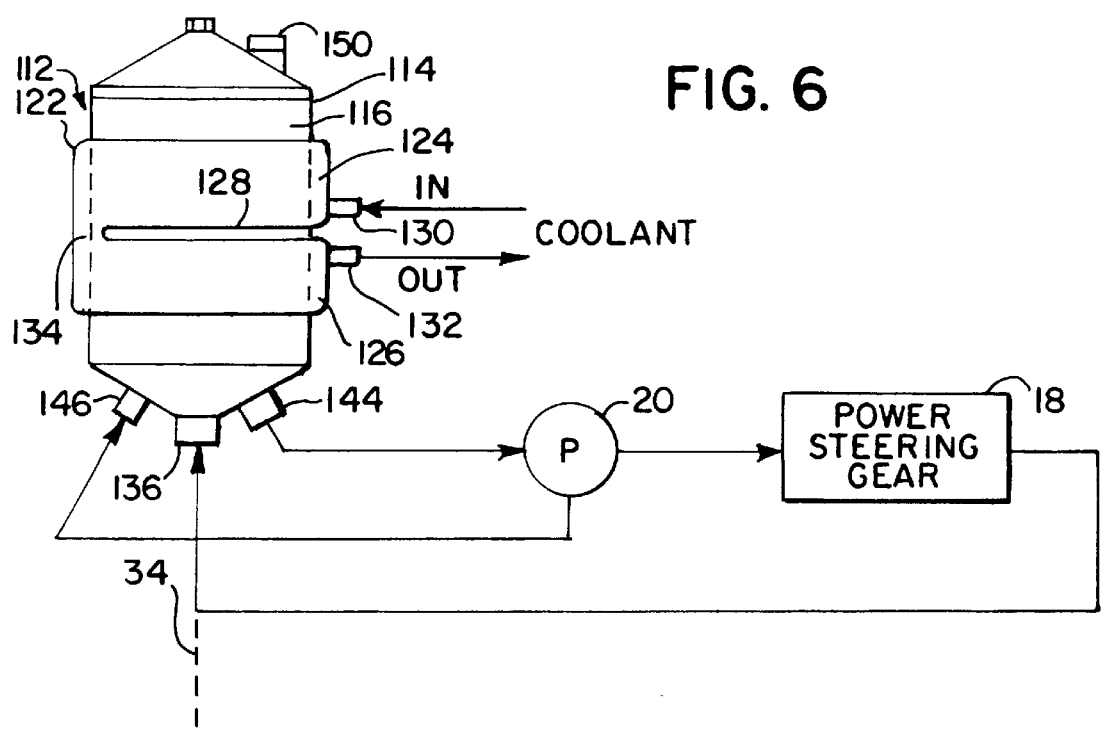
FIG. 6 is a view like FIG. 1 and shows a further embodiment.

FIG. 6 is like FIG. 1 and shows a further embodiment of a combined power steering hydraulic fluid reservoir and cooling unit 112 including a housing 114 having a reservoir tank 116 for receiving and collecting hydraulic fluid from power steering gear 18 and holding the hydraulic fluid in readiness for supply to hydraulic pump 20. The tank is provided by a cylindrical canister extending axially along vertical axis 34. The housing has a heat exchanger 122 with a cooling liquid flow path therethrough in heat transfer relation with the hydraulic fluid in tank 116. The heat exchanger is provided by an annular jacket around the canister. The jacket has upper and lower axially spaced annular chambers 124 and 126 separated by a circumferential divider wall or baffle 128 therebetween.

Figure 7:
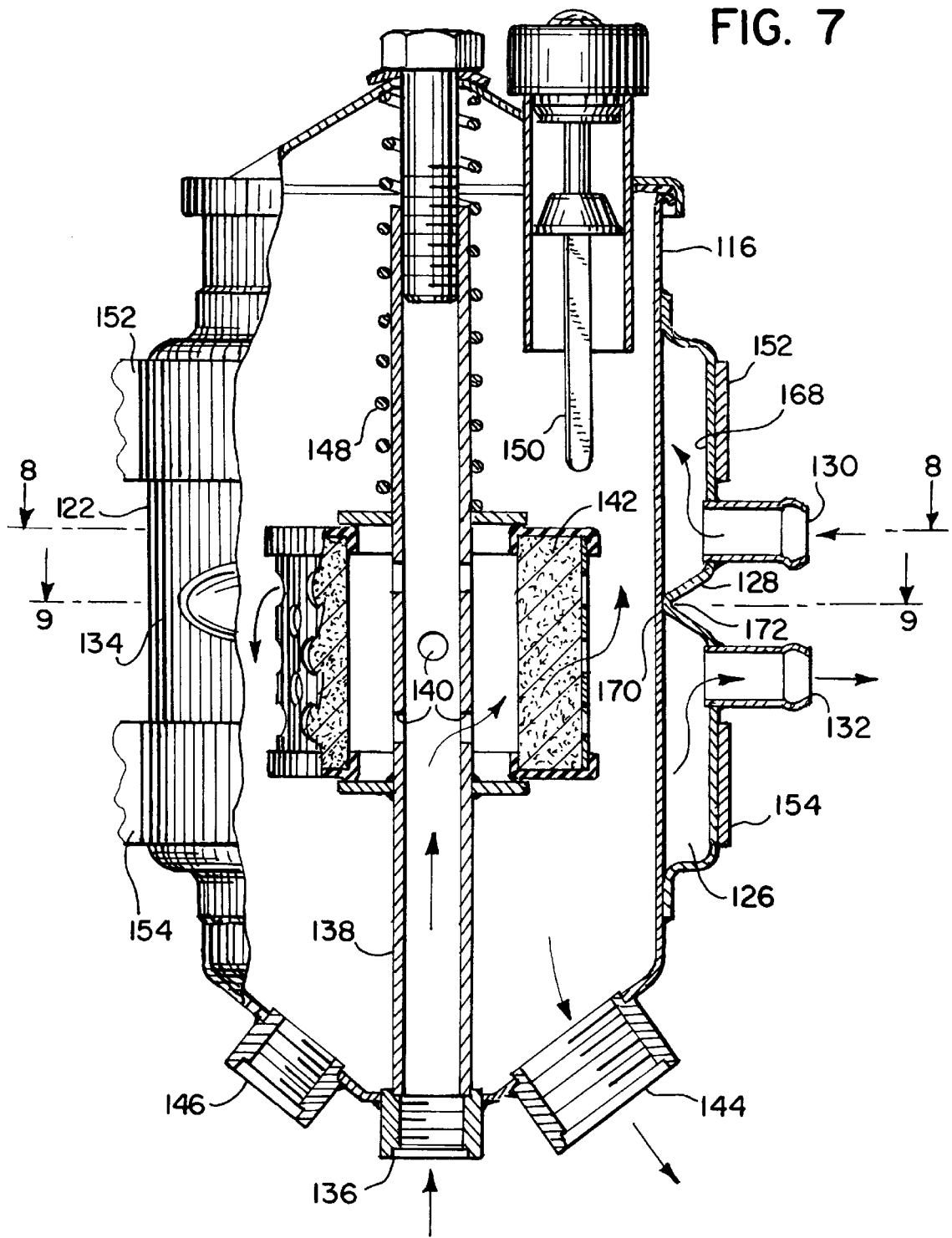
FIG. 7 is a view like FIG. 2 and shows a further embodiment.

Annular chamber 124 has a cooling liquid inlet 130, and annular chamber 126 has a cooling liquid outlet 132. Baffle 128 has a transfer passage 134 therethrough, FIGS. 6–9, such that the cooling liquid flow path is through cooling liquid inlet 130, then through annular chamber 124, then through transfer passage 134, then through annular chamber 126, then through cooling liquid outlet 132. The hydraulic fluid flow path is from hydraulic fluid inlet 136, FIGS. 6, 7, then upwardly through central standpipe 138, then radially outwardly through apertures 140 then through filter 142 against the side wall of tank 116, then to hydraulic fluid outlet 144. Bypass inlet 146 to the tank is provided for receiving excess flow from pump 20. If filter 142 becomes clogged, or the pressure drop thereacross otherwise exceeds a given threshold, such pressure build-up compresses bypass spring 148 axially upwardly to enable hydraulic fluid flow to bypass filter 142, as above described. Dipstick 150 enables checking of hydraulic fluid level. A pair of mounting bands or straps 152, 154 extend around jacket 122 and have ends such as 156, 158, FIGS. 8 and 9, mountable to a vertical surface in the engine compartment such as a fire wall, etc., and tightenable by a bolt 160.

Figure 8:
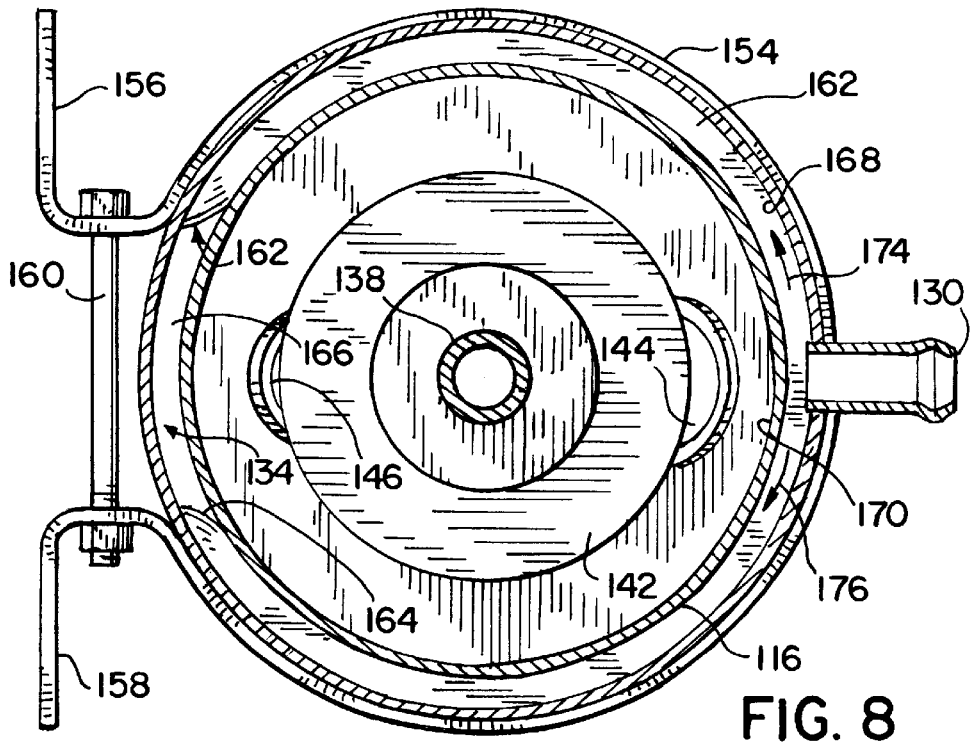
FIG. 8 is a sectional view taken along line 8—8 of FIG. 7.
Figure 9:
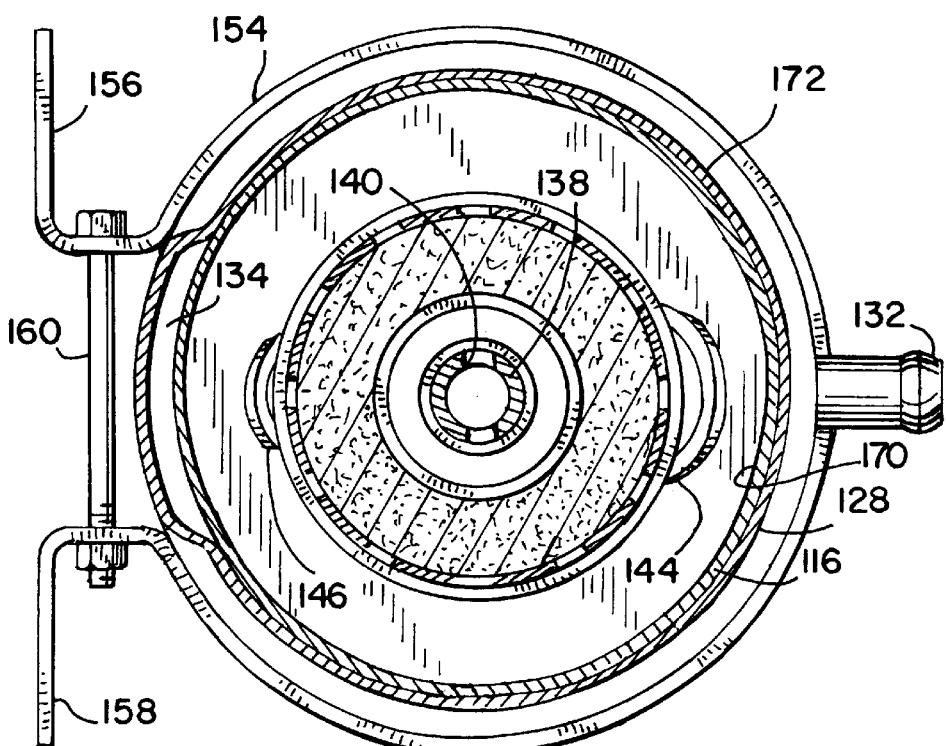
FIG. 9 is a sectional view taken along line 9—9 of FIG. 7.

Baffle 128 is C-shaped in radial cross section as shown at 162 in FIG. 8. The facing ends 164 and 166 of the C-shape 162 define transfer passage 134 in the circumferential arcuate gap 166 therebetween. Transfer passage 134 extends axially along canister 116 between annular chambers 124 and 126. Jacket 122 is an annular sleeve having a side wall 168 spaced radially outwardly of canister 116 to define an annular space therebetween. Baffle 128 is provided by a recessed groove formed in side wall 168 of the sleeve and extending radially inwardly towards side wall 170 of the canister. The groove extends partially circumferentially around the canister and divides the annular space into the noted annular chambers 124 and 126 and provides the noted C-shaped baffle therebetween. Cooling liquid inlet 130 and cooling liquid outlet 132 are diametrically opposite gap 166 between facing ends 162 and 164 of the C-shape 162. Baffle groove 128 is V-shaped in axial cross-section, FIG. 7, with the apex 172 of the V engaging tank 116 at side wall 170.

As above noted, transfer passage 134 through baffle 128 is diametrically opposite cooling liquid inlet 130 along the circumference of cylindrical canister 116 such that cooling liquid from cooling liquid inlet 130 splits into two paths in annular chamber 124, a path 174, FIG. 8, traversing 180° in a semi-circle to transfer passage 134, and a path 176 traversing oppositely from first path 174 and 180° in a semi-circle to transfer passage 134, such that cooling liquid from cooling liquid inlet 130 splits into two paths 174, 176 and then rejoins at transfer passage 134. Transfer passage 134 is diametrically opposite cooling liquid outlet 132 along the circumference of cylindrical canister 116 such that cooling liquid from transfer passage 134 splits into two paths in annular chamber 126, a path traversing 180° in a semicircle to cooling liquid outlet 132, and another path traversing oppositely and 180° in a semicircle to cooling liquid outlet 132, such that cooling liquid from transfer passage 134 splits into two paths and then rejoins at cooling liquid outlet 132.

Hydraulic fluid flows radially outwardly through filter 142 and against side wall portion 170 of canister 116. Jacket 122 is around portion 170 of the side wall of the canister and provides the noted cooling chamber thereat. Hydraulic fluid exiting from filter 142 flows against cooled portion 170 of the side wall of the canister and gives up heat to cooling liquid in cooling chambers 124, 126 provided by jacket 122, such that hydraulic fluid is filtered first and cooled second. This is preferred because there is then less pressure drop at the cooling interface, and because filtering of hot fluid reduces the chance of bypass spring 148 opening.

It is recognized that various equivalents, alternatives and modifications are possible within the scope of the appended claims.

I claim:

1. A combined power steering hydraulic fluid reservoir and cooling unit comprising a housing having a reservoir tank for receiving and collecting hydraulic fluid from a power steering gear and holding said hydraulic fluid in readiness for supply to a hydraulic pump, said reservoir tank comprising a cylindrical canister extending axially along an axis said housing having a heat exchanger with a cooling liquid flow path therethrough in heat transfer relation with said hydraulic fluid, said heat exchanger comprising an annular jacket around said canister, said jacket having first and second axially spaced annular chambers separated by a circumferential baffle therebetween, said first annular chamber having a cooling liquid inlet, said second annular chamber having a cooling liquid outlet, said baffle having a transfer passage therethrough such that said cooling liquid flow path is through said cooling liquid inlet, then through said first annular chamber, then through said transfer passage through said baffle, then through said second annular chamber, then through said cooling liquid outlet, wherein said baffle is C-shaped in radial cross-section with facing ends of the C-shape defining said transfer passage in the gap therebetween.

2. The unit according to claim 1 wherein said transfer passage extends axially along said canister between said first and second annular chambers.

3. The unit according to claim 2 wherein said jacket comprises an annular sleeve having a side wall spaced radially outwardly of said canister to define an annular space therebetween, said side wall of said sleeve having a recessed groove formed therein extending radially inwardly towards said canister, said groove extending partially circumferentially around said canister and dividing said annular space into said first and second annular chambers and providing said C-shaped baffle therebetween.

4. The unit according to claim 3 wherein said cooling liquid inlet and said cooling liquid outlet are diametrically opposite said gap between said facing ends of said C-shape.

5. The unit according to claim 4 wherein said groove is V-shaped in axial cross section, with the apex of the V engaging said canister.

6. A combined power steering hydraulic fluid reservoir and cooling unit comprising a housing having a reservoir tank for receiving and collecting hydraulic fluid from a power steering gear and holding said hydraulic fluid in readiness for supply to a hydraulic pump, said reservoir tank comprising a cylindrical canister extending axially along an axis, said housing having a heat exchanger with a cooling liquid flow path therethrough in heat transfer relation with said hydraulic fluid, said heat exchanger comprising an annular jacket around said canister, said jacket having first and second axially spaced annular chambers separated by a circumferential baffle therebetween, said first annular chamber having a cooling liquid inlet, said second annular chamber having a cooling liquid outlet, said baffle having a transfer passage therethrough such that said cooling liquid flow path is through said cooling liquid inlet, then through said first annular chamber, then through said transfer passage through said baffle, then through said second annular chamber, then through said cooling liquid outlet, wherein said transfer passage through said baffle is diametrically opposite said cooling liquid inlet along the circumference of said cylindrical canister such that cooling liquid from said cooling liquid inlet splits into two paths in said first annular chamber, a first path traversing 180° in a semi-circle to said transfer passage through said baffle, and a second path traversing oppositely from said first path and 180° in a semi-circle to said transfer passage through said baffle, such that cooling liquid from said cooling liquid inlet splits into said first and second paths and then rejoins at said transfer passage through said baffle.

7. A combined power steering hydraulic fluid reservoir and cooling unit comprising a housing having a reservoir tank for receiving and collecting hydraulic fluid from a power steering gear and holding said hydraulic fluid in readiness for supply to a hydraulic pump, said reservoir tank comprising a cylindrical canister extending axially along an axis, said housing having a heat exchanger with a cooling liquid flow path therethrough in heat transfer relation with said hydraulic fluid, said heat exchanger comprising an annular jacket around said canister, said jacket having first and second axially spaced annular chambers separated by a circumferential baffle therebetween, said first annular chamber having a cooling liquid inlet, said second annular chamber having a cooling liquid outlet, said baffle having a transfer passage therethrough such that said cooling liquid flow path is through said cooling liquid inlet, then through said first annular chamber, then through said transfer passage through said baffle, then through said second annular chamber, then through said cooling liquid outlet, wherein said transfer passage through said baffle is diametrically opposite said cooling liquid outlet along the circumference of said cylindrical canister such that cooling liquid from said transfer passage splits into two paths in said second annular chamber, a first path traversing 180° in a semi-circle to said cooling liquid outlet, and a second path traversing oppositely from said first path and 180° in a semi-circle to said cooling liquid outlet, such that cooling liquid from said transfer passage splits into said first and second paths and then rejoins at said cooling liquid outlet.

8. A combined power steering hydraulic fluid reservoir and cooling unit comprising a housing having a reservoir tank for receiving and collecting hydraulic fluid from a power steering gear and holding said hydraulic fluid in readiness for supply to a hydraulic pump, said reservoir tank comprising a cylindrical canister extending axially alone an axis, said housing having a heat exchanger with a cooling liquid flow path therethrough in heat transfer relation with said hydraulic fluid, said heat exchanger comprising an annular jacket around said canister, said jacket having first and second axially spaced annular chambers separated by a circumferential baffle therebetween, said first annular chamber having a cooling liquid inlet, said second annular chamber having a cooling liquid outlet, said baffle having a transfer passage therethrough such that said cooling liquid flow path is through said cooling liquid inlet, then through said first annular chamber, then through said transfer passage through said baffle, then through said second annular chamber, then through said cooling liquid outlet, wherein said transfer passage through said baffle is diametrically opposite said cooling liquid inlet along the circumference of said cylindrical canister such that cooling liquid from said cooling liquid inlet splits into two paths in said first annular chamber, a first path traversing 180° in a semi-circle to said transfer passage through said baffle, and a second path traversing oppositely from said first path and 180° in a semi-circle to said transfer passage through said baffle, such that cooling liquid from said cooling liquid inlet splits into said first and second paths and then rejoins at said transfer passage through said baffle, and wherein said transfer passage through said baffle is diametrically opposite said cooling liquid outlet along the circumference of said cylindrical canister such that cooling liquid from said transfer passage splits into two paths in said second annular chamber, a third path traversing 180° in a semi-circle to said cooling liquid outlet, and a fourth path traversing oppositely from said first path and 180° in a semi-circle to said cooling liquid outlet, such that cooling liquid from said transfer passage splits into said third and fourth paths and then rejoins at said cooling liquid outlet.

9. A combined power steering hydraulic fluid reservoir and cooling unit comprising a reservoir tank for receiving and collecting hydraulic fluid from a power steering gear and holding said hydraulic fluid in readiness for supply to a hydraulic pump, said reservoir tank comprising a cylindrical canister extending axially along an axis and having a side wall extending axially between distally opposite axial ends, said canister having a hydraulic fluid inlet, a hydraulic fluid outlet, and a hydraulic fluid filter in a flow path between said hydraulic fluid inlet and said hydraulic fluid outlet, an annular jacket around said canister and having a cooling liquid inlet and a cooling liquid outlet, said jacket providing a cooling chamber convectively cooling said hydraulic fluid in said canister through said side wall of said canister.

10. The unit according to claim 9 wherein said hydraulic fluid from said hydraulic fluid inlet flows radially through said filter and then radially against a portion of said side wall of said canister, and wherein said jacket is around said portion of said side wall of said canister and provides said cooling chamber thereat, such that hydraulic fluid exiting said filter flows against a cooled said portion of said side wall of said canister and gives up heat to cooling liquid in said cooling chamber provided by said jacket, said hydraulic fluid being filtered first and cooled second.

11. The unit according to claim 9 wherein said jacket has first and second axially spaced annular chambers separated by a circumferential baffle therebetween, said first annular chamber having said cooling liquid inlet, said second annular chamber having said cooling liquid outlet, said baffle having a transfer passage therethrough such that said cooling liquid flow path is through said cooling liquid inlet then through said first annular chamber then through said transfer passage through said baffle then through said second annular chamber then through said cooling liquid outlet.

12. The unit according to claim 11 wherein said transfer passage through said baffle is diametrically opposite said cooling liquid inlet along the circumference of said cylindrical canister such that cooling liquid from said cooling liquid inlet splits into two paths in said first annular chamber, a first path traversing 180° in a semi-circle to said transfer passage through said baffle, and a second path traversing oppositely from said first path and 180° in a semi-circle to said transfer passage through said baffle, such that cool ing liquid from said cooling liquid inlet splits into said first and second paths and then rejoins at said transfer passage through said baffle.

13. The unit according to claim 11 wherein said transfer passage through said baffle is diametrically opposite said cooling liquid outlet along the circumference of said cylindrical canister such that cooling liquid from said transfer passage splits into two paths in said second annular chamber, a first path traversing 180° in a semi-circle to said cooling liquid outlet, and a second path traversing oppositely from said first path and 180° in a semi-circle to said cooling liquid outlet, such that cooling liquid from said transfer passage splits into said first and second paths and then rejoins at said cooling liquid outlet.

14. The unit according to claim 11 wherein said transfer passage through said baffle is diametrically opposite said cooling liquid inlet along the circumference of said cylindrical canister such that cooling liquid from said cooling liquid inlet splits into two paths in said first annular chamber, a first path traversing 180° in a semi-circle to said transfer passage through said baffle, and a second path traversing oppositely from said first path and 180° in a semi-circle to said transfer passage through said baffle, such that cooling liquid from said cooling liquid inlet splits into said first and second paths and then rejoins at said transfer passage through said baffle, and wherein said transfer passage through said baffle is diametrically opposite said cooling liquid outlet along the circumference of said cylindrical canister such that cooling liquid from said transfer passage splits into two paths in said second annular chamber, a third path traversing 180° in a semi-circle to said cooling liquid outlet, and a fourth path traversing oppositely from said first path and 180° in a semi-circle to said cooling liquid outlet, such that cooling liquid from said transfer passage splits into said third and fourth paths and then rejoins at said cooling liquid outlet.

* * * * *